A. LARKIN.
FRUIT-BAG.

No. 188,153.  Patented March 6, 1877.

WITNESSES
Henry N. Miller
C. L. Evert

INVENTOR
Albert Larkin
T. H. Alexander
ATTORNEY

UNITED STATES PATENT OFFICE.

ALBERT LARKIN, OF ALMOND, NEW YORK, ASSIGNOR OF ONE-HALF HIS RIGHT TO HILAND S. HALL, OF SAME PLACE.

IMPROVEMENT IN FRUIT-BAGS.

Specification forming part of Letters Patent No. 188,153, dated March 6, 1877; application filed September 9, 1876.

*To all whom it may concern:*

Be it known that I, ALBERT LARKIN, of Almond, in the county of Allegany and State of New York, have invented certain new and useful Improvements in Fruit-Bags; and I do hereby declare that the following is a full, clear, and exact description thereof, reference being had to the accompanying drawings, and to the letters of reference marked thereon, which form part of this specification.

The nature of my invention consists in the construction and arrangement of a fruit-bag, as will be hereinafter more fully set forth.

In order to enable others skilled in the art to which my invention appertains to make and use the same, I will now proceed to describe its construction and operation, referring to the annexed drawing, in which—

Figure 1:
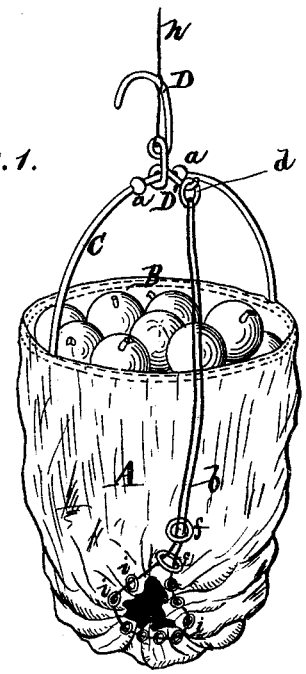
Figure 2:
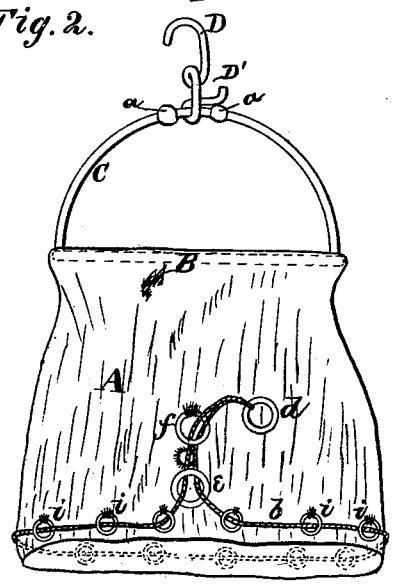

Figure 1 is a perspective view of my fruit-bag as it appears when full of fruit. Fig. 2 is a side view of the same open for emptying.

A represents a bag, of any suitable dimensions, fastened on a circular frame, B, of wire or other suitable material. This frame is provided with a stationary bail, C, on which, near the center, are shoulders or projections $a\,a$. Between these shoulders, on the bail C, is a double hook, D D', which turns on the bail. The bottom of the bag A is open, or, properly speaking, it has no bottom, and near the lower end, at suitable distances apart, are fastened rings $i\,i$, through which passes a cord, $b$, having a ring, $d$, attached to its ends. The cord is, however, first passed through a loose ring, $e$, and then through a ring, $f$, fastened to the side of the bag, as shown. To the double hook D D' is attached a cord, $h$.

The upper or large part D of the hook is hung over the ladder or limb. The ring $d$ is then drawn up and hung on the hook D', which puckers or draws together the bottom of the bag. When the bag is filled it is lowered by the cord $h$, and the ring $d$ is disengaged by the double hook turning on the bail, so as to allow the fruit to slide through the bottom of the bag to the ground, or into a basket or other receptacle, when the bag is again drawn up without the picker descending from the tree.

Having thus fully described my invention, what I claim as new, and desire to secure by Letters Patent, is—

The combination of the frame B, with stationary bail C, double rotating hook D D', bottomless bag A, with rings $i$, cord $b$, with ring $d$, and cord $h$, all substantially as and for the purposes herein set forth.

In testimony that I claim the foregoing as my own I affix my signature in presence of two witnesses.

ALBERT LARKIN.

Witnesses:
    BARTON J. GREEN,
    GEO. H. GOFF.